United States Patent [19]

Harwood et al.

[11] Patent Number: 5,470,928
[45] Date of Patent: Nov. 28, 1995

[54] FREE RADICAL COPPER(II)-ENOLATE POLYMERIZATION INITIATORS

[75] Inventors: H. James Harwood, Stow, Ohio; Stephen D. Goodrich, Mankato, Minn.

[73] Assignee: University of Akron, Akron, Ohio

[21] Appl. No.: 381,472

[22] Filed: Jan. 31, 1995

Related U.S. Application Data

[62] Division of Ser. No. 34,103, Mar. 22, 1993, Pat. No. 5,405,913.

[51] Int. Cl.$^6$ .................................................. C08F 4/50
[52] U.S. Cl. ..................... 526/172; 526/118; 526/135; 526/145; 526/147; 525/269
[58] Field of Search .................................. 526/118, 135, 526/145, 147, 172; 525/269

[56] References Cited

U.S. PATENT DOCUMENTS 4,009,150  2/1977  Norling .................................. 526/147

OTHER PUBLICATIONS

PhD Dissertation thesis by Stephen D. Goodrich, entitled "Investigation of Free Radical Polymerizations Initiated by Anaerobic Copper(II) Oxidation of Enolates derived from Aldehydes and Ketones", Univ. Microfilms Int.

*Primary Examiner*—Mark Nagumo
*Attorney, Agent, or Firm*—Oldham & Oldham, Co.

[57] ABSTRACT

The invention describes a redox initiating system consisting of $Cu^{II}$ salts, enolizable aldehydes and ketones, and various combinations of coordinating agents for $Cu^{II}$, coordinating agents for $Cu^{I}$, and a strong amine base that is not oxidized by $Cu^{II}$. In particular, $Cu^{II}$ octanoate/dibenzyl ketone/pyridine/triethylamine/triphenylphosphine systems are effective. In addition to initiating free radical polymerizations and copolymerizations, this initiating system can be applied to the synthesis of functionalized telechelics, polymers with ketone linkages in the backbone, block and graft copolymers consisting of free-radical and step-growth polymer blocks, and crosslinking reactions.

11 Claims, 5 Drawing Sheets

FREE RADICAL COPPER(II)-ENOLATE POLYMERIZATION INITIATORS

This is a divisional of application Ser. No. 08/034,103 filed on Mar. 22, 1993, now U.S. Pat. No. 5,405,913.

TECHNICAL FIELD

The invention described herein pertains generally to the initiation of free radical polymerizations by $Cu^{II}$ oxidation of enolates derived from aldehydes and ketones.

BACKGROUND OF THE INVENTION

Among the several methods for initiating free-radical polymerizations are redox reactions using metal salt oxidizing agents and organic aldehyde or ketone reducing agents. However, the use of aldehydes and ketones in this fashion has been fairly limited in spite of their widespread availability and range of potential functional groups contained therein.

Additionally, of the wide range of metal salts available, copper (Cu) salts have found limited success as polymerization initiators in spite of their widespread availability and low cost. In fact, in some instances copper salts have been found to inhibit the reaction.

Many transition metal salts are capable of oxidizing aldehydes and ketones. The oxidation of ketones with the powerful oxidants dichromate ($[Cr^{VI}_2O_7]^{2-}$) and permanganate ($[Mn^{VII}O_4]^{1-}$) forms carboxylic acids by inner-sphere cleavage of the ketone carbon skeleton. Oxidation of ketones by $Pb^{IV}$ or $Tl^{III}$ acetates, however, leaves the carbon skeleton intact but results in rapid inner-sphere acetoxylation of the ketone. Neither of these outcomes produces a free radical that can be used to initiate vinyl polymerizations. Moreover, permanganate and dichromate can oxidize olefin bonds (such as those present on vinyl monomers) to 1,2-glycols.

It is known that the use of metal-organic redox systems based on powerful single electron transfer (SET) oxidants such as $Co^{III}$, $Ce^{IV}$, $Mn^{III}$ and $V^V$ (typically in acidic solutions) to initiate free radical polymerizations of styrene, methyl methacrylate, acrylates and acrylonitrile reveal the following undesirable phenomena:

(1) oxidative termination of polymerization by the metal ion is usually observed, especially with donor-type monomers (e.g., styrenes) that can stabilize the cationic charge produced by outer-sphere oxidation of their propagating free radicals;

(2) $Co^{III}$, $Ce^{IV}$ and $Fe^{III}$ ions have been shown to induce efficient conversion of various monomers to free radicals; and (3) oxidation of functional groups such as alcohols by these metal ions (even aromatic and aliphatic hydrocarbons such as biphenyl and cyclohexane by acidic $Co^{III}$) limits the possible range of functional groups that can be present in the system.

Clearly, a large number of metal ion-based redox systems that can be used successfully in organic synthesis do not meet the demanding selectivity requirements imposed by homogeneous free radical polymerization systems.

In general, it can be easily seen, that there has existed a need for a redox initiating system that permits synthesis of controlled, predictable polymer end-group structures. Furthermore, it is highly desirable that the initiating redox system be relatively mild thereby permitting many other useful functional groups to be present and not be oxidized by the initiator.

SUMMARY OF THE INVENTION

In accordance with the present invention, there is provided a $Cu^{II}$-enolate free-radical initiation system for polymerizations and copolymerization in solution, bulk, suspension or emulsion systems.

It is an object of this invention to provide the synthesis of polymers with controlled, predictable end-group structure that can bear a useful functional group.

It is another object of this invention to provide a synthesis of block and graft copolymers essentially free of homopolymers, which is the exception rather than the rule for free radical block and graft copolymerization schemes.

It is still another object of this invention to synthesize thermoplastic elastomers with the potential for enhanced solvent and flame resistance in both the elastomeric and hard block portions, as well as the potential for higher $T_g$ or $T_m$ hard blocks which can be composed of homopolymers or copolymers polymerized by addition or step-growth mechanisms.

It is still another object of this invention to initiate free-radical polymerizations and copolymerizations in solution, bulk, suspension and emulsion.

It is yet another object of this invention to synthesize polymers with ketone backbone linkages.

It is still yet another object of this invention to synthesize block copolymers by blocking-from enolizable aldehyde or ketone chain-end functional prepolymers which are prepared by free-radical or step-growth polymerizations or by suitable modification of a preformed polymer.

It is a still further object of this invention to synthesize crosslinked or graft copolymers by grafting-from or crosslinking-from prepolymers with enolizable aldehyde or ketone backbone groups.

These and other objects of this invention will be evident when viewed in light of the figures, detailed description and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

The chemical reaction described in this invention generates initiating free radicals in a metal-organic redox system in which $Cu^{II}$ salts remove a single electron from the enolate forms of aldehydes and ketones, rather than from the keto or enol forms of these substrates. This process converts the enolates regioselectively into α-carbonyl free radicals of predictable structure capable of initiating free radical polymerizations and copolymerizations of vinyl monomers and dienes.

In this invention, novel methods of achieving the following synthetic operations in polymer chemistry are taught:

(1) initiation of free-radical polymerizations and copolymerizations in solution, bulk, suspension or emulsion systems;

(2) synthesis of free-radical initiated polymers or copolymers with ketone linkages as part of the main chain;

(3) synthesis of free-radical initiated polymers or copolymers with aldehyde or ketone chain-ends, including chain ends bearing additional functional groups, such as hydroxy, chloro, oxirane, ester, amide, or isocyanate groups;

(4) synthesis of block copolymers by blocking-from polymers with enolizable aldehyde or ketone chain-ends using monomers that can be free-radically polymerized to form the second or additional blocks; and (5) synthesis of graft copolymers or crosslinking, both of which can be achieved by grafting-from polymers with pendant or backbone groups that are enolizable aldehyde or ketone groups using monomers that can be free-radically polymerized to form the grafts, if termination is by disproportionation or chain transfer, or crosslinks if termination is by combination.

The previously-mentioned synthetic reactions make use of the ability of $Cu^{II}$ salts to oxidize the enolate forms of aldehydes and ketones to free radicals capable of initiating free-radical polymerizations and copolymerizations. The initiating system is comprised of:

(1) aldehydes or ketones bearing enolizable hydrogen atoms;

(2) a $Cu^{II}$ salt, or a combination of $Cu^{II}$ and $Cu^{I}$ salts, which can induce the desired enolate oxidation reaction without interfering with the other reactions necessary to obtain the desired polymer;

(3) optional components, such as added ligands for the $Cu^{II}$ and $Cu^{I}$ ions (e.g., pyridine and triphenylphosphine) which may facilitate the reduction of $Cu^{II}$ to $Cu^{I}$, and a tertiary amine (e.g., triethylamine) or other stronger base to facilitate enolate formation, care being taken that none of these optional components is readily oxidized by $Cu^{II}$, enters into other undesirable reactions (e.g., Schiff base formation) with the aldehydes or ketones or other redox system components, or in any other way interferes with the desired outcome of the redox-initiated polymerization or copolymerization.

Because the solvent medium in which the oxidation reactions are performed is rendered basic by the coordinating agents for $Cu^{II}$ and/or the strong amine base, the enolate forms of the aldehydes and ketones are the intermediates that are oxidized. Since the negatively-charged enolate has a greater electron donating capability toward the $Cu^{II}$ ion than the non-enolized or enol form of an aldehyde or ketone, the presence of the enolate tends to preclude oxidation of the non-enolized or enol forms of aldehydes and ketones. Therefore, since initiating free radical formation proceeds via the charged enolate, the rate of initiation achieved in these initiating systems has an enhanced sensitivity to factors that are normally manipulated to increase the rates of ionic reactions. Such factors include:

(1) use of a solvent medium of higher/lower polarity; and (2) use of aromatic or aliphatic aldehyde or ketone substrates as initiators that bear electron-withdrawing/donating groups capable of increasing/decreasing the acidity of the proton-bearing (enolizable) carbons adjacent to the carbonyl group.

The use of the term solvent in this application is meant to include the instance where the solvent is the polymerizable monomer.

Since equilibration of the $Cu^{II}$-complexed enolate with the non-enolized form of the substrate within the coordination sphere of the $Cu^{II}$ ion appears to facilitate SET oxidation of the enolate, the rate of initiation can be increased by increasing the concentration of the substrate that is to be oxidized.

The system is not moisture-sensitive. The reaction temperature can range from −100° C. to +200° C., but it is easily recognized that the permissible range of temperatures will be highly monomer dependent. An oxygen-free environment is preferred, but not required, and in fact, catalytic amounts of oxygen to regenerate $Cu^{II}$ from $Cu^{I}$ may be desirable in some circumstances. The reaction time can range from 1 sec. to 48 hours or longer, depending upon reaction conditions. In a preferred embodiment, the following optional components of the redox system are present: a $Cu^{II}$ ligand to aid in the dissolution of both $Cu^{II}$ and $Cu^{I}$ ions, e.g. pyridine; a non-oxidizable base to promote the formation of the enol form of the aldehyde or ketone, e.g. triethylamine; and a $Cu^{I}$ ligand to preferentially stabilize the $Cu^{I}$ thereby enabling blocking when the concentration of end-groups is small, e.g. triphenylphosphine.

The chemical reaction which generates initiating free radicals in this invention (i.e. the $Cu^{II}$ oxidation of the enolates of aldehydes and ketones) is an example of a SET redox reaction. The distinctive feature of a SET redox reaction is the transfer of a single electron or its equivalent (e.g., a bromine atom) between an oxidant and a reductant. The SET redox reaction is an example of one in which a transition metal salt or other metal salt acts as the oxidant and an organic substrate (in its anionic form) acts as the reductant.

The SET oxidation of an organic substrate (e.g., a ketone or ketone enolate) by a metal ion oxidant consists of two major mechanistic steps:

(1) the oxidation of the substrate to a radical, which may or may not be bound to the reduced form of the metal ion; and (2) the subsequent reaction of the radical, including:

(a) further oxidation of the radical by the metal ion;
(b) dimerization of the free radical with another free radical; and
(c) initiation of free radical homopolymerizations and copolymerizations of vinyl monomers by the free radical.

The detailed examples in this invention describe methods by which the $Cu^{II}$-enolate redox system can be used successfully in polymer synthesis.

SET redox systems involving an organic substrate and a transition metal salt or other metal salt can be further subdivided into two major mechanistic categories. When the electron-transfer step is accompanied by transfer of a ligand from the metal salt to the organic substrate, as shown by the reaction below, the oxidation is believed to involve ligand bridging between the metal ion and the organic substrate. This mechanism is termed inner-sphere because the electron transfer step appears to take place within the coordination sphere of the metal ion.

$$R \cdot + Cu^{II}Br_2 \rightarrow R\text{—}Br + Cu^{I}Br$$

If ligand transfer does not accompany electron transfer, as depicted by the reaction below (phen=1,10-phenanthroline), the oxidation is believed to involve a direct electron transfer from the organic substrate to the metal ion. This mechanism is termed outer-sphere because the electron transfer appears to take place outside the coordination sphere of the metal ion.

$$R^- + [Fe^{III}(phen)_3]^{3+} \rightarrow R \cdot + [Fe^{II}(phen)_3]^{2+}$$

The $Cu^{II}Br_2$ and $[Fe^{III}(phen)_3]^{2+}$ salts appearing in the redox equations in the preceding paragraph are extreme examples of metal ions that oxidize organic substrates by inner-sphere and outer-sphere mechanisms, respectively. In general, ligands that coordinate tightly to metal ions (e.g., phenanthroline, oxyanions [e.g., carboxylate, sulfate, nitrate]), tend to induce the outer-sphere mechanism, while ligands that coordinate less tightly (e.g., halide, pseudohalide [e.g., thiocyanate, azide, xanthate]), tend to induce the inner-sphere mechanism.

Because of the high susceptibility of free radical polymerizations to inhibition due to undesirable termination reactions involving inner-sphere ligand transfer (from metal halides, in particular $Cu^{II}Br_2$, $Fe^{III}Br_3$, etc.), the redox systems used in this invention typically involve pyridine complexes of $Cu^{II}$ carboxylates, which tend to induce an outer-sphere oxidation mechanism. The mildness of $Cu^{II}$ as an oxidant also helps to minimize undesirable outer-sphere oxidative termination reactions when using monomers that can stabilize the cationic charge resulting from free radical oxidation (e.g., styrenes). The importance of this matter will become obvious when polymer synthesis techniques requiring the absence of oxidative termination reactions by the $Cu^{II}$ ion are discussed.

The ability of an organic substrate to be oxidized to a useful free radical depends on several factors, the list including:

(1) the ease of reduction of the metal ion or other oxidant as it exists in the system of interest;
(2) the ease of oxidation of the organic substrate as it exists in the system of interest;
(3) the stability of the product free radical; and
(4) the preference for the desired oxidation mechanistic pathway (i.e. outer-sphere) to the exclusion of other pathways that do not form a free radical, or that destroy it once it forms.

Organic molecules most susceptible to redox attack tend to have unshared electron pairs (such as are found on O, N, and S atoms), or have π-electron systems (such as acetylenes), which are more susceptible to attack than purely σ-bonded systems (such as alkanes). Thus, when selective oxidation of aldehyde or ketone enolates by $Cu^{II}$ salts to produce initiating free radicals is desired, functional groups that are more readily oxidized by $Cu^{II}$ (e.g., phenols, carboxylic acids, aromatic amines and acetylenes) must not be present in unprotected form or these substrates will be preferentially oxidized by $Cu^{II}$.

One essential criterion which must be met if a SET redox reaction is to occur is that the reduction potential of the oxidant should be higher than the reduction potential of the organic radical.

The identity of the bonding ligands on the metal ions additionally affects the reduction potential of the redox couple. For instance, the reduction potential for the $Cu^{II}/Cu^{I}$ redox couple is increased by the presence of triphenylphosphine or pyridine, since they both function as Lewis bases that preferentially stabilize the $Cu^{I}$ ion. Thus, the reactivity of $Cu^{II}$ carboxylate-pyridine complexes as oxidants of alkyl radicals in glacial acetic acid has been found to be highly dependent on the pyridine concentration. In non-aqueous systems, pyridine also facilitates solubilization of the $Cu^{II}$ salt in organic media.

Thus, although numerous metal ion salts could conceivably be used to oxidize aldehyde and ketone enolates, the mildness of $Cu^{II}$ as an oxidant, coupled with the ease of synthesizing organic-soluble $Cu^{II}$ salts of long-chain carboxylic acids, makes it a desirable metal ion to work with. The polymerization systems detailed in the following examples, which involve a variety of vinyl monomers, have been shown to be stable to the $Cu^{II}/Cu^{I}$ complexes.

In aqueous or non-aqueous solutions, certain Lewis acids (electron acceptors, e.g., $Cu^{II}$) and certain Bronsted bases, such as aliphatic, aromatic, and heteroaromatic tertiary amines ($R_3N$, which may also function as Lewis bases (electron donors) by complexing with the Lewis acid), can coexist and function as cooperative catalysts of aldehyde or ketone enolization. The Lewis acid complexes with the carbonyl oxygen atom of the aldehyde or ketone and accepts electron density from it, which enhances the electropositive character of the carbonyl carbon. As a result, the acidity of proton-bearing carbons adjacent to the carbonyl carbon is increased, facilitating their deprotonation by the Bronsted base ($R_3N$) to form $R_3NH^+$ and an enolate complexed to the $Cu^{II}$ ion. The $Cu^{II}$-enolate complex can decompose via protonation of the complexed enolate by $R_3NH^+$ in two ways: 1) protonation on the initially-deprotonated carbon to regenerate the non-enolized aldehyde or ketone, or 2) protonation on the carbonyl oxygen atom, which forms the enol; in both cases $R_3N$ and the $Cu^{II}$ ion are recovered. Thus, this basic-solution enolization scenario involves simultaneous, coordinated Lewis-acid and Bronsted-base catalysis.

Decomposition of the $Cu^{II}$-enolate complex can also be achieved if an electron from the complexed enolate is transferred to the $Cu^{II}$ ion. This is an example of a single-electron transfer oxidation-reduction (SET redox) reaction. The SET redox reaction forms a radical and a $Cu^{I}$ ion. The actual complex that undergoes the SET redox reaction with $Cu^{II}$ could be a complex between $Cu^{I}$ and the enolate, resulting in formation of two $Cu^{I}$ ions and a radical bound to one of them. Subsequently, as the $Cu^{I}$ concentration slowly increases, a more rapid SET oxidation of the $Cu^{I}$-enolate complex by $Cu^{II}$ begins to predominate, which explains the rate enhancement observed when a soluble $Cu^I$ salt, or another source of $Cu^I$ such as copper powder, is added to the system initially. The redox system mechanism thus described is autocatalytic in $Cu^I$.

As stated earlier, the radical formed from the enolate by the SET oxidation reaction may remain bound to a $Cu^I$ ion and subsequently regain the transferred electron by resonance, which forms a $Cu^{II}$-enolate complex. Separation of the bound radical from the $Cu^I$ ion, which requires sufficient stability of the resultant α-carbonyl free radical and $Cu^I$ complex, completes the decomposition and allows the α-carbonyl free radical to be used to initiate free radical homopolymerizations and copolymerizations of vinyl monomers.

The $Cu^{II}$-enolate redox system, as used in this invention, produces α-carbonyl free radicals with well-defined structures that initiate free radical polymerizations and copolymerizations of vinyl monomers and dienes. Desirable features of this redox system include:

(1) resistance of the free radicals produced to further oxidation (inner-sphere or outer-sphere) by the $Cu^{II}$ ion;

(2) absence of aldol condensation reactions (benzylic aldehydes require use of an aprotic solvent; aldol/acetal products form in methanol);

(3) capability to drive the redox system by using triphenylphosphine, which forms stable complexes with the $Cu^I$ ion;

(4) capability to obtain nearly quantitative yields of a single, well-defined dimer product when oxidizing benzylic ketones; and (5) high regioselectivity of free radical formation.

The initiating free radicals produced by $Cu^{II}$ oxidation of aldehyde and ketone enolates, particularly the benzylic substrates, are relatively stable. Monomers that produce resonance-stabilized propagating free radicals (e.g., styrene, acrylates, methacrylates, etc.) can be initiated readily, even when using the benzylic aldehyde or ketone initiators. However, monomers that do not produce resonance-stabilized propagating free radicals (e.g., vinyl esters, vinyl and vinylidene halides, ethylene, etc.) are expected to be more resistant to initiation. Vinyl acetate, in particular, has been found to be more resistant to initiation. Vinyl acetate, in particular, has been found to be polymerized to very low conversions when using acetone or acetophenone as the initiator, but does not polymerize at all when dibenzyl ketone or mesityl oxide are used as initiators. Therefore, for instance, with some or all of these less reactive monomers, blocking from a polymer with benzylic ketone chain-ends to make a block copolymer may not be possible.

Finally, unlike the vinyl monomers, diene monomers such as butadiene and isoprene are susceptible to oxidative termination by the $Cu^{II}$ ion, though chloroprene seems to be less affected if at all. The propagating free radicals produced by butadiene are highly-stable allylic radicals which have been reported to undergo rapid acetoxylation in the presence of $Cu^{II}$ acetate. Perhaps for this reason, even copolymerization of isoprene or butadiene with acrylonitrile is not induced by the $Cu^{II}$-enolate system under homogeneous solution conditions which induce polymerization of other vinyl monomers and chloroprene.

Design of suspension or emulsion polymerization systems that confine the $Cu^{II}$ ion to the aqueous phase could be used to good advantage when attempting to initiate diene polymerizations using the $Cu^{II}$-enolate initiating system. These heterogeneous techniques could also permit the use of more powerful metal ion or other oxidants, though functional groups present on the initiator would probably still be susceptible to oxidation. Conversely, successful confinement of the $Cu^{II}$ ion to the organic phase in an inverse-emulsion polymerization system could allow polymerizations of acrylic and methacrylic acid monomers (which would be oxidized by the $Cu^{II}$ ion in homogeneous solution) to be initiated by the $Cu^{II}$-enolate initiating system.

Polymerization-Copolymerization

The following reaction is typical of the type of reaction, shown in pertinent part only, which would benefit from the initiators described previously.

In this reaction, an enolizable aldehyde or ketone is reacted with a $Cu^{II}$ salt, or a mixture of $Cu^{II}$ and $Cu^I$ salts, wherein the $Cu^{II}$ salt can be, but is not limited to, a nitrate, sulfate, perchlorate or carboxylate and the $Cu^I$ salt can be, but is not limited to, a complex of a $Cu^I$ salt with two or three triphenylphosphines. In a preferred mode, the $Cu^{II}$ and $Cu^I$ salts will not have halide or pseudohalide (i.e., thiocyanate, azide, etc.) ligands. Tertiary amine bases, having various combinations of aliphatic and/or aromatic substituents on the nitrogen (e.g., triethylamine, dimethylphenylamine), or that are heteroaromatic (e.g., pyridines) may be added. A trisubstituted phosphine, preferably a triphenylphosphine, may also be added, although other trisubstituted phosphines which do not adversely affect the system can also be used. The 3° amine and/or phosphine reagents can be attached to a crosslinked resin system to make a bound $Cu^{II}/Cu^I$ system (e.g., crosslinked poly(vinyl pyridines)).

In the above reaction, R can be H, or any alkyl, and/or aryl or other group that will not interfere with the oxidation or initiation/polymerization reactions. Without limiting the scope of coverage in that the list is for purposes of illustration only, specific examples are: $CH_3$; $C_2H_5$; $C_6H_5$; $ClCH_2CH_2$—; $HOCH_2CH_2$—; and $(RO)_3Si$—$(CH_2)_n$—. Yet additional examples would include:

$R^1$ can be an alkyl or aryl group, preferably an aryl group for blocking and grafting reactions, that does not bear functionality that interferes with the initiation process. With certain monomers, care must be taken in the choice of $R^1$ so that initiating radicals of sufficient reactivity are generated. Additionally, $\alpha,\beta$- or $\beta,\gamma$-unsaturated aldehydes and ketones also react as coinitiators. $R^1$ can be substituted with a functional group (e.g., alcohol, ester, oxirane, etc.) and may also be a heterocyclic group. For illustrative purposes, examples of $Cu^{II}$ sensitive functional groups include unprotected phenolic, carboxylic acid (although carboxylic acid salts may in certain circumstances work effectively), 1° and 2° amines, alkyne and thiol groups. $R^2$ and $R^3$ are generally alkyl or aryl, including substituted derivatives thereof, with the provision that $R^2$ and $R^3$ not be hydrogen. And X is any divalent bridging group. The value of n in a preferred embodiment will be 10 or greater, although it is possible to have a value as low as about 2. The upper limit on the value for n is monomer dependent.

M can be any reactive monomer or monomer combination that can be polymerized by conventional free radical techniques and that is not oxidized rapidly by $Cu^{II}$, examples of which would include, but not be limited to, styrene, substituted styrenes, chloroprene, acrylate esters, methacrylate esters, (meth)acrylic acid salts, hydroxyethyl methacrylate, vinyl halides, vinylidene halides, acrylonitrile, substituted acrylonitriles, methacrylonitrile, acrylamide, methacrylamide, vinyl esters, etc. M should not contain unprotected phenolic, 1°, 2°, or aromatic amine, acetylene, thiol or carboxylic acid functional groups (although carboxylic acid salts are not problematic), since these groups are oxidized or interfere in this environment. If R and $R^1$ are part of a polymer chain-end, the polymer backbone can have any structure, but should not contain groups that would allow it to participate in the polymerization of the monomer M or to interfere with the initiation process. In a preferred embodiment, the structure will not contain unsaturation.

Less-reactive monomers such as vinyl acetate are more sensitive to the initiating radical, and are difficult to initiate by benzylic ketone or other initiators producing stable initiating radicals, but can be initiated by acetophenone, acetone, or similar initiators. Conversions, however, tend to be lower than with more reactive monomers. Significant to this invention is the ability to control the rate of polymerization through the use of appropriate aromatic substituents on certain aromatic initiators. Illustrative, but not limiting to this invention, in decreasing order of kinetics would be:

faster intermediate

This rate control is attributed to the electron-withdrawing (e.g., Cl) or electron-donating (e.g., methoxy) character of the aromatic substituent, which increases or decreases, respectively, the acidity of the enolizable carbons and thus increases or decreases, respectively, the initiation rate.

The polymer chain-ends are attached via a ketone group. The ketone group can be photodegraded to remove the chain-end. By reacting the chain-end ketone groups with a peroxycarboxylic acid in a Baeyer-Villiger reaction, the ketone groups can be converted into ester groups that can be degraded by acid/base hydrolysis.

In general, the concentration of $Cu^{II}$ salt can be present in an extremely wide range of concentrations. If oxygen is present in the system, then only catalytic amounts of $Cu^{II}$ are necessary. The concentration range can be as low as $10^{-6}$M and as high as 0.1M. Similarly, the concentration range of the enolizable aldehyde or ketone group has a correspondingly large range of values, ranging from $10^{-6}$M to 5.0M. The monomer(s) concentration can range from 0.1M to bulk. The other components in the system (e.g. $Cu^{II}$ ligand, non-oxidizable or non-interfering base, and $Cu^{I}$ ligand), which may or may not be present, appear to have a threshold dependence upon the concentrations of $Cu^{II}$ and enolizable aldehyde or ketone present.

Polymers with Telechelic Functional Groups

The schematic polymerization reaction for polymers with telechelic functional groups is identical with that shown for the Polymerization-Copolymerization section, including the considerations applicable to the Markush groups R and $R^1$, except that R and/or $R^1$ contain functional groups (e.g. alcohol, ester, oxirane, amide, isocyanate, ketone, aldehyde, etc.) R and $R^1$ may also contain protected functional groups that can be readily synthesized by conventional techniques, (e.g., t-butyl esters, t-butoxycarbonyloxy derivatives of phenols, silyl amines, etc.)

Synthesis of Block Copolymers

Block copolymers are synthesized by using polymers or copolymers bearing enolizable functional groups, typically aldehydes and ketones, as macroinitiators in redox-initiated polymerizations and copolymerizations of vinyl monomers or dienes where the second component of the redox system is preferably a $Cu^{II}$ salt. The starting polymers or copolymers can be obtained by typical free radical polymerization using appropriate initiators and/or chain transfer agents, ionic ring-opening polymerization using appropriate initiators and/or chain transfer agents, or polycondensation techniques using monofunctional reactants that also bear enolizable aldehyde or ketone functionality. The enolizable functional groups may be introduced during the polymerization or polycondensation process or by chemical modification subsequent to the polymerization process.

Block polymerizations and copolymerizations are initiated when the enolizable groups react with copper salts to generate free radicals. The following reaction is typical of the type of reaction, shown in pertinent part only, which would benefit from the initiators described previously.

In this reaction, an enolizable aldehyde or ketone is reacted with a $Cu^{II}$ salt, or a mixture of $Cu^{II}$ and $Cu^{I}$ salts, wherein the $Cu^{II}$ salt can be, but is not limited to, a nitrate, sulfate, perchlorate or carboxylate, and the $Cu^{I}$ salt can be, but is not limited to, a $Cu^{I}$ complex with two or three triphenylphosphines. In a preferred mode, the $Cu^{II}$ and $Cu^{I}$ salts will not have halide or pseudohalide ligands. In a more preferred embodiment, R and $R^1$ are aryl groups, and in a most preferred embodiment, the aryl groups will contain electron-withdrawing groups (i.e., chloro).

Tertiary amine bases having various combinations of aliphatic and/or aromatic substituents on the nitrogen (e.g., triethylamine, dimethylphenylamine), or that are heteroaromatic (e.g., pyridines), may be added. A trisubstituted phosphine, preferably a triphenylphosphine, may also be added; other trisubstituted phosphines that do not adversely affect the system may also be used. The 3° amine and/or phosphine reagents may be attached to a crosslinked resin system to make a bound $Cu^{II}/Cu^{I}$ system (e.g., crosslinked poly(vinyl pyridines)).

Whether M or N are the same or different monomers, the same definition previously defined for M being equally applicable to N, the resultant polymer will have ketone groups that form linkages between the polymer blocks that are part of the main chain. These ketone linkages can be photodegraded to separate the blocks. By reacting the ketone groups with a peroxycarboxylic acid in a Baeyer-Villiger reaction, the ketone block linkages will be converted to ester linkages that can be degraded by acid/base hydrolysis to separate the blocks.

The structure of the block copolymer obtained depends on both:
(1) the functionality of the initiator; and
(2) the mode of termination.

With a monofunctional initiator and termination by disproportionation, then a diblock is obtained. Correspondingly, with a monofunctional initiator and termination by combination, then an A-B-A triblock is obtained. When a difunctional initiator is used, and termination is by disproportionation, then a triblock is formed. Additionally, when using a difunctional initiator and the termination is by combination, then a multiblock polymer is formed.

Polycondensates or any other prepolymers with enolizable aldehyde or ketone chain-ends introduced by chain transfer or chemical modification can also function as macroinitiators. If one of the monomers (M or N) forms rubbery segments, and if polymerization of the rubbery segment terminates by combination, a thermoplastic elastomer is formed. The mode of initiation/termination determines whether a diblock, a triblock copolymer or a multiblock copolymer is formed. Triblock copolymers are formed when termination occurs by disproportionation, and multiblock copolymers are formed when termination occurs by combination.

-continued or metathesis reactions:

-continued

P, as defined in the above reaction schematics, represents the backbone of the macroinitiator. There are very few limitations on how P can be defined. In general, it can have any structure except that it should not contain groups that would enable it to participate in the propagation reactions or interfere with the initiation process. As discussed previously, the values for n can range from about 2 with an upper limit being monomer dependent, with values for y being similarly dependent. Permissible monomer values of M are consistent with those previously defined, as with the limitations on R and $R^1$.

When the glass transition temperature, $T_g$, of P is below ambient temperature, the P moiety has elastomeric character. Thermoplastic elastomers are obtained when the P-based macroinitiator is used to initiate the formation of polymer segments that have high $T_g$'s. For example, chain-ends may be used to initiate the polymerization of methyl methacrylate (MMA) to form a PMMA-H/BD-PMMA triblock TPE wherein H/BD refers to a hydrogenated polybutadiene segment. If the polymerization of styrene were initiated instead, the result would be a [-PS-H/BD-PS-] multiblock TPE.

Elastomeric macroinitiators can also be prepared by modifying elastomeric polymers containing small amounts of in-chain unsaturation using ozonolysis, Such polymers can also be prepared by polymerizations conducted in the presence of initiators or chain transfer agents that impart enolizable aldehyde or ketone chain ends.

P can also be the backbone of a polymer having a $T_g$ above room temperature. Examples of such polymers are polystyrene, poly(methyl methacrylate), styrene-acrylonitrile copolymers, polycarbonates, polyesters, polycondensates derived from di-epoxides, poly(phenylene oxide), poly(phenylene sulfide), polysulfones, etc. When these polymers are used as macroinitiators to initiate polymerization of monomers or monomer mixtures that form elastomers, TPE's result provided that the polymerization of the rubbery segment terminates by combination of propagating macroradicals so that the required block sequence: (hard block)-(rubbery block)-(hard block), is obtained. Examples of such monomers are butadiene, chloroprene, acrylates, unsaturated esters, etc.

Triblock TPEs can also be prepared using precursor polymers that bear a single enolizable aldehyde or ketone chain-end. In this case, the polymerization can be represented as follows, where P is a polymer that has a high glass transition temperature and M is the monomer or monomer mixture that polymerizes to form an elastomeric polymer.

In the approach above, it is necessary that the polymerization of the rubbery block terminate by combination of propagating macroradicals.

Although some care must be devoted to the selection of R and $R^1$ so that free radicals of sufficient reactivity are generated, the process can tolerate any type of functionality that does not adversely affect the system. Examples of sensitive functional groups are phenolic, carboxylic acid (although carboxylic acid salts are not problematic), primary and secondary amine, alkyne and thiol groups. However, esters, alcohols, amides, nitriles, oxiranes, and isocyanate groups should not interfere. As shown in the general reaction, the oxidative generation of initiating free radicals is facilitated by tertiary amines, such as triethylamine and pyridine, and is particularly facilitated by trisubstituted phosphines, such as triphenylphosphine.

Examples of starting polymers that bear enolizable groups and can be used as macroinitiators would include the following:

(1) polymers derived from vinyl monomers that contain R—CO—CH=CH—CH$_2$—CH(OCOR$^1$)-polymer or R—CO—CH=CH—CH$_2$—CH(X)-polymer endgroups wherein R and R$^1$ are hydrocarbon groups or substituted hydrocarbon groups or any other groups that are not sensitive to the initiating system and X is a halogen atom;

(2) polycondensates, such as polyesters, polyethers, polyamides, polyurethanes, epoxy, etc., that bear enolizable aldehyde or ketone end groups; and

(3) polymers and copolymers prepared by free-radical polymerization methods in the presence of chain transfer agents that produce enolizable ketone or aldehyde end-groups, or prepared using initiators that bear enolizable aldehyde or ketone moieties.

The monomer can be almost any vinyl monomer or diene that can be polymerized or copolymerized by conventional free radical polymerization techniques. Examples are styrene, substituted styrenes, butadiene, chloroprene, acrylate esters, methacrylate esters, vinyl halides, vinylidene halides, acrylonitrile, acrylamide, methacrylonitrile, methacrylamide, and vinyl esters. M can also represent a mixture of monomers yielding a copolymer.

Graft Copolymer Synthesis or Crosslinking

Graft copolymers are synthesized by using polymers or copolymers bearing enolizable functional groups, typically aldehydes and ketones, as macroinitiators in redox-initiated polymerizations and copolymerizations of vinyl monomers where the second component of the redox system is preferably a Cu$^{II}$ salt. The starting polymers or copolymers can be obtained by typical free radical polymerization, ionic ring-opening polymerization or polycondensation techniques. The enolizable functional groups may be introduced during the polymerization or polycondensation process or by chemical modification subsequent to their formation. Naturally-occurring polymers such as cellulose, starch, chitin, keratin, and collagen, and their derivatives, can also be modified to introduce enolizable functional groups. Similarly, synthetic polymers (e.g., poly(vinyl alcohol)), can be further modified to introduce enolizable functional groups. Normally, soluble polymers will be employed in this invention, but it is possible to modify crosslinked polymers, otherwise insoluble polymers or metal and ceramic surfaces to introduce enolizable groups that can serve as coinitiators for subsequent polymer grafting reactions.

Graft polymerizations are initiated when the enolizable groups react with copper salts to generate free radicals. The following reaction is typical of the type of reaction, shown in pertinent part only, which would benefit from the initiators described previously. In this reaction, a polymer containing an enolizable aldehyde or ketone group is reacted with a Cu$^{II}$ salt, or a mixture of Cu$^{II}$ and Cu$^{I}$ salts, wherein the Cu$^{II}$ salt can be, but is not limited to, a nitrate, sulfate, perchlorate, or carboxylate, and the Cu$^{I}$ salt can be, but is not limited to, a complex of a Cu$^{I}$ salt with two or three triphenylphosphines. In a preferred mode, the Cu$^{II}$ and Cu$^{I}$ salts will have non-halide/pseudohalide ligands. In a more preferred embodiment, R and R$^1$ are aryl groups, and in a most preferred embodiment, the aryl groups will contain electron-withdrawing groups (i.e., chloro). Additionally, tertiary amine bases, having various combinations of aliphatic and/or aromatic substituents on the nitrogen (e.g., triethylamine, dimethylaniline), or that are heteroaromatic (e.g., pyridines) may be added. A trisubstituted phosphine, preferably a triphenylphosphine, may also be used; other phosphines that do not adversely affect the system can also be used. The 3° amine and/or phosphine reagents may be attached to a crosslinked resin system to make a bound Cu$^{II}$/Cu$^{I}$ system (e.g., crosslinked poly(vinyl pyridines)).

Whether M and N are the same or different monomers, the graft or crosslink linkage is a ketone that can be photodegraded to break apart the main chain from the graft or break apart the network structure. By reacting the ketone groups with a peroxycarboxylic acid in a Baeyer-Villiger reaction, ester graft or network linkages that can be degraded by acid-base hydrolysis will form. If free radical polymerization of monomer N terminates by disproportionation or chain transfer, the N-based blocks will form grafts; if the termination is by combination, the N-based blocks will act as crosslinks. Although some care must be devoted to the selection of R and R$^1$, so that free radicals of sufficient reactivity are generated, the process can tolerate any functionality that does not adversely affect the system. Examples of sensitive functional groups are phenolic, carboxylic acid, primary and secondary amine, alkyne and thiol groups. However, esters, alcohols, amides, nitriles, oxiranes, and isocyanate groups should not interfere. As shown in the general reaction, the oxidative generation of initiating free radicals is facilitated by tertiary amines, such as triethylamine and pyridine, and is particularly facilitated by trisubstituted phosphines, such as triphenylphosphine.

Examples of starting polymers that bear enolizable groups and can be used as macroinitiators would include the following:

(1) polymers and copolymers of unsaturated ketones, such as methyl vinyl ketone, benzyl vinyl ketone, vinyl acetophenone, benzyl styryl ketone, etc.;

(2) acylated derivatives of polymers or copolymers derived from aromatic monomers, an example of which is phenylacetylated polystyrene; and (3) ether or ester derivatives of polysaccharides such as cellulose or starch that bear ketone or aldehyde groups.

Macroinitiators for graft copolymerization or crosslinking can also be obtained by polymer modification. For instance, polystyrene, polystyrene-poly(ethylene-co-butylene)-polystyrene block copolymers, or acid-resistant (bisphenol-A)-based polycondensates may be acylated under Friedel-Craft conditions to obtain suitable precursors to grafting/crosslinking reactions or using a step growth polymer.

EXAMPLES

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

Example 1

Synthesis of Epoxy-Functional Initiator:
4-Glycidyloxyphenyl benzyl ketone (GPBK)

Figure 1:
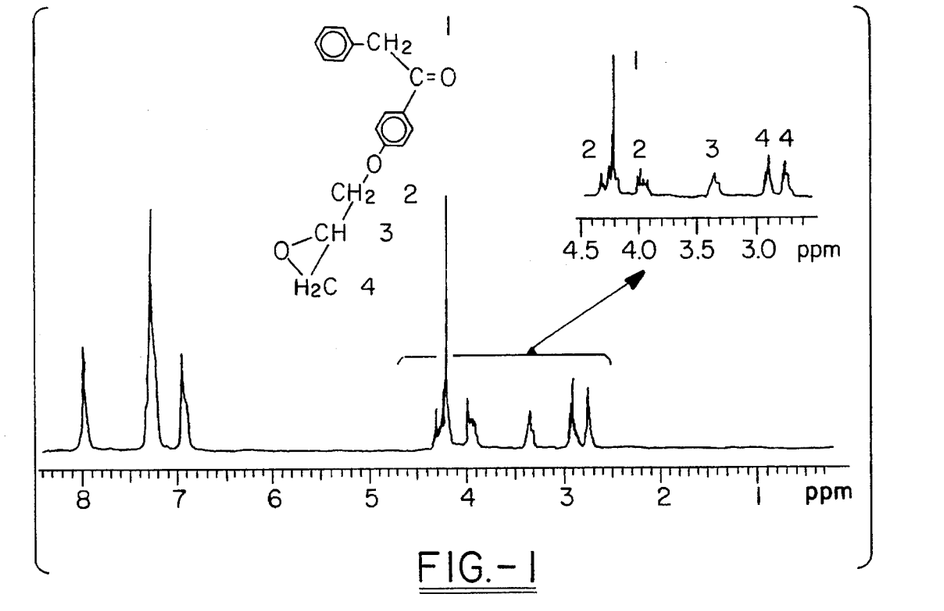
FIG. 1 is a proton NMR spectrum of the epoxy initiator shown synthesized in Example 1.

A 100 ml 3-neck round-bottom flask equipped with a magnetic stir bar, thermometer and reflux condenser was charged with 11.0 g epichlorohydrin, 5.0 g 4-hydroxyphenyl benzyl ketone, and 0.1 ml $H_2O$. The reactants were stirred on a hotplate. NaOH was then added, ~0.2 g per addition, up to a total of 0.95 g NaOH. The rate of NaOH addition was controlled to keep the reaction temperature below 100° C. At the end of the exothermic reaction, excess epichlorohydrin was removed by vacuum distillation with the flask temperature kept below 150° C. The residue was air-dried, then recrystallized twice from ethanol and redried. The yield was 2.8 g (44%), m.p. 81.0°–82.4° C. A $^1$H-NMR spectrum of this compound, with peak assignments, is provided in FIG. 1.

The reaction sequence is shown below:

EXAMPLE 2

Synthesis of Epoxy-Telechelic Polystyrene (PS-GPBK)

| Reactant | grams | Conditions | |
|---|---|---|---|
| $Cu^{II}$ octanoate | 0.10 | | |
| Pyridine | 1.00 | $N_2$ purge | 5 min. |
| Triphenylphosphine | 0.30 | | |
| GPBK (Ex. 1) | 0.50 | temperature | 70° C. |
| Styrene | 15.00 | | |
| Benzene | 5.00 | time | 1 hr. |

Figure 2:
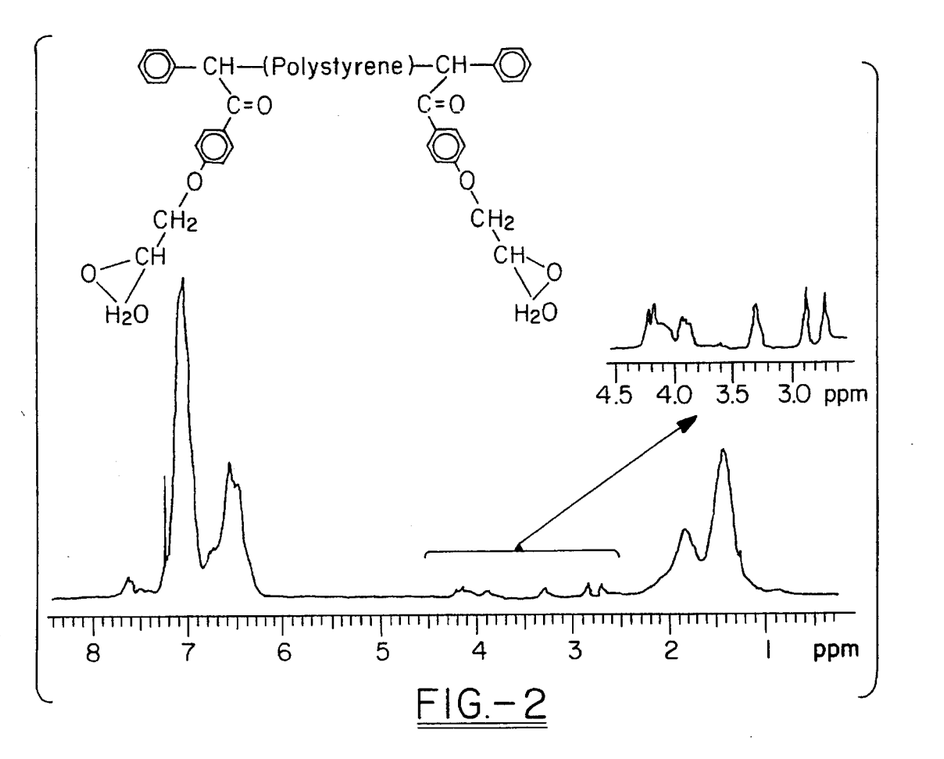
FIG. 2 is a proton NMR spectrum of epoxy-telechelic polystyrene (PS-GPBK)

The epoxy-telechelic polystyrene was prepared by mixing the above reactants under the identified conditions and allowed to react. The reaction mixture was diluted with THF and the resulting solution poured into methanol to precipitate the product. Unless identified otherwise, all subsequent examples followed a similar synthetic procedure. The polymer yield was 2.1 g (14%). In FIG. 2, a $^1$H-NMR spectrum of the polymer is provided. A comparison of this spectrum with the $^1$H-NMR spectrum of GPBK in FIG. 1, reveals the presence of the epoxy end-groups.

Example 3

Synthesis of Initiator with Protected Phenol Group:
4-(t-Butoxycarbonyloxy)-propiophenone (4-tBOC-Propiophenone)

A 500 ml round-bottom flask was charged with 7.5 g of 4-hydroxypropiophenone, 5.7 g potassium t-butoxide, and 250 ml dry tetrahydrofuran (THF). The mixture was refluxed for 1 hr., then 12.0 g di-t-butyl-dicarbonate in 50 ml dry THF was added. After 6 hours reflux, the mixture was added to ice-water, extracted with ethyl acetate, and concentrated by evaporation. The crude residue was recrystallized from petroleum ether. The yield was 5.0 g (40%), m.p. 84.2°–85.8° C.

Example 4

Synthesis of Protected-Phenol-Telechelic Polystyrene

| Reactant | grams | Conditions | |
|---|---|---|---|
| $Cu^{II}$ octanoate | 0.10 | | |
| Pyridine | 0.67 | $N_2$ purge | 5 min. |
| Triethylamine | 0.07 | | |
| Triphenylphosphine | 0.30 | temperature | 70° C. |
| 4-tBOC-Propiophenone (Ex. 3) | 1.55 | | |
| Styrene | 5.0 | time | 12 hr. |

-continued

| Reactant | grams | Conditions | |
|---|---|---|---|
| Benzene | 8.7 | | |

The polymer was precipitated from THF solution into methanol and the polymer yield was 1.8 g (36%). The t-BOC protecting groups are known to be removable by acid (i.e. trifluoroacetic acid) hydrolysis in solution or by heating the bulk polymer (i.e. 200° C. for ~15 min.)

Example 5

Synthesis of Aromatic-Cl Telechelic Polystyrene

| Reactant | grams | Conditions | |
|---|---|---|---|
| $Cu^{II}$ octanoate | 0.10 | | |
| Pyridine | 0.67 | $N_2$ purge | 5 min. |
| Triethylamine | 0.10ml | | |
| Triphenylphosphine | 0.30 | temperature | 70° C. |
| 4-Chloropropiophenone | 1.04 | | |
| Styrene | 5.0 | time | 2 hr. |

| Reactant | grams | Conditions |
|---|---|---|
| Benzene | 9.4 | |

The polymer was precipitated from THF solution into methanol and the polymer yield was 1.4 g (28%). $M_n$ (GPC): 26,000; $M_w/M_n$: 1.7.

| Reactant | grams | Conditions |
|---|---|---|
| Benzene | 20.0 | |

The polymer was precipitated from THF solution into methanol and the polymer yield was 13.0 g (33%). $M_n$ (GPC): 29,000; $M_w/M_n$: 2.2. The synthesis followed the following reaction scheme:

PS-DBK

Example 6

Synthesis of Telechelic Polystyrene Macroinitiator (PS-DBK)

| Reactant | grams | Conditions | |
|---|---|---|---|
| Cu$^{II}$ octanoate | 0.40 | | |
| Pyridine | 2.0 | N$_2$ purge | 5 min. |
| Dibenzyl ketone (DBK) | 0.80 | temperature | 70° C. |
| Styrene | 40.0 | time | 6 hr. |

Example 7

Synthesis of Telechelic Polystyrene Macroinitiator (PS-DBK)

| Reactant | grams | Conditions | |
|---|---|---|---|
| Cu$^{II}$ octanoate | 0.10 | | |
| Pyridine | 0.50 | N$_2$ purge | 5 min. |
| Triethylamine | 0.03 | | |
| DBK | 0.20 | temperature | 70° C. |
| Styrene | 5.0 | time | 6 hr. |

-continued

| Reactant | grams | Conditions |
|---|---|---|
| Benzene | 9.7 | |

The polymer was precipitated from THF solution into methanol and the polymer yield was 2.6 g (52%). $M_n$ (GPC): 18,000; $M_w/M_n$: 1.9

Example 8

Synthesis of Telechelic Poly(Styrene-co-Acrylonitrile) Macroinitiator

| Reactant | grams | Conditions | |
|---|---|---|---|
| $Cu^{II}$ octanoate | 0.50 | | |
| Pyridine | 3.0 | $N_2$ purge | 15 min. |
| Triphenylphosphine | 1.50 | temperature | 40° C. |
| DBK | 1.00 | | |
| Styrene | 50.0 | time | 10 min. |
| Acrylonitrile | 25.0 | | |

The polymer was precipitated from THF solution into methanol and the polymer yield was 14.0 g (19%)

Example 9

Synthesis of Bisphenol-A Epoxy Macroinitiator for Blocking (BPA-HPBK)

| Reactant | grams |
|---|---|
| Bisphenol-A | 4.72 |
| Bisphenol-A diglycidyl ether | 8.50 |
| 4-Hydroxyphenyl benzyl ketone (HPBK) | 0.32 |
| Triethanolamine | 0.13 |
| Methanol | 5.0 ml |

The reactants listed above were stirred in a heated 50 ml round-bottom flask for 2 hours, then transferred to an 80 ml beaker and heated at 90° C. under vacuum for 12 hours. The hardened polymer was dissolved in THF and precipitated into hexane. Polymer yield: 12.5 g (92%).

Example 10

Synthesis of Bisphenol-A Polyester Macroinitiator for Blocking (PE-HPBK)

| Reactant | grams |
|---|---|
| Bisphenol-A | 5.81 |
| HPBK | 0.40 |
| Terephthaloyl chloride | 2.64 |
| Isophthaloyl chloride | 2.64 |
| Pyridine (dry) | 5.0 ml |
| Methylene chloride | 120.0 ml |

Bisphenol-A was dissolved in 20 g methylene chloride and 5.0 g pyridine, then added via a pressure-equalizing addition funnel to the acid chlorides, which were dissolved in methylene chloride in a 250 ml round-bottom flask. The temperature was regulated below 30° C. with an ice-water bath. The reagents were stirred for 1 hour at room temperature (20° C.) after final addition. Then HPBK was dissolved in 5.0 g methylene chloride and 0.5 g pyridine and added to the other reagents. The mixture was stirred an additional ½-hour. Pyridinium hydrochloride precipitate was removed by filtration. The polymer was precipitated in methanol. The yield of the polymer was 9.7 g. Schematically, the reaction is as follows:

Bisphenol-A Epoxy Macroinitiator (Similarly, Polycarbonate, Polyester, Polysulfone, etc.)

Example 11

Synthesis of Poly(Vinyl Acetate) Macroinitiator for Blocking

| Reactant | grams | Conditions | |
|---|---|---|---|
| Vinyl acetate | 20.0 | | |
| Butyraldehyde | 1.0 | $N_2$ purge | 5 min. |
| Azobisisobutyronitrile | 0.04 | temperature | 60° C. |
| Benzene | 20.0 | time | 30 hrs. | polymer yield 15.0 g (75%)

After 30 hours, the solution was dissolved in 40 g benzene and 3 g triethylamine and heated at 60° C. for 12 hours. The solution was then precipitated in hexane; the polymer was then re-preciptated from methanol into water. Final yield: 15 g. $M_n$ (GPC): 8,500; $M_w/M_n$: 2.2. The enolizable ketone chain-ends are formed by acyl radical chain transfer by butyraldehyde to form aliphatic ketone chain-ends. The acetate units adjacent to these ends are then eliminated to form $\alpha,\beta$- and $\beta,\gamma$-unsaturated ketone chain-ends.

Example 12

Synthesis of Poly(Styrene-co-Methyl Vinyl Ketone) Macroinitiator for Grafting or Crosslinking [P(S-MVK)]

| Reactant | grams | Conditions | |
|---|---|---|---|
| Styrene | 5.0 | | |
| Methyl vinyl ketone | 1.0 | $N_2$ purge | 5 min. |
| Azobisisobutyronitrile | 0.02 | temperature | 60° C. |
| Benzene | 20.0 | time | 24 hrs. |

The final solution was diluted with THF and then precipitated into methanol. Polymer yield: 3.3 g (55%). $M_n$(GPC): 53,000; $M_w/M_n$: 1.7.

Example 13

Synthesis of Poly(Vinyl Acetate-b-Styrene) Block Copolymer

| Reactant | grams | Conditions | |
|---|---|---|---|
| $Cu^{II}$ acetate | 0.06 | | |
| Pyridine | 0.40 | $N_2$ purge | 5 min. |
| Triethylamine | 0.05 | temperature | 60° C. |
| PVAc Macroinitiator (Ex. 11) | 2.0 | | |
| Styrene | 4.0 | time | 24 hrs. |
| Methanol | 10.0 | | |

The block copolymer was precipitated in the methanol medium, which dissolves PVAc homopolymer. Insoluble precipitate yield: 1.6 g. $M_n$ (GPC): 42,000; $M_w/M_n$: 2.7.

Example 14

Synthesis of Poly(Styrene-b-Methyl Methacrylate) Block copolymer

| Reactant | grams | Conditions | |
|---|---|---|---|
| $Cu^{II}$ octanoate | 0.05 | | |
| Pyridine | 0.67 | $N_2$ purge | 5 min. |
| Triethylamine | 0.10ml | temperature | 70° C. |
| Triphenylphosphine | 0.30 | | |
| PS-DBK Macroinitiator (Ex. 7) | 0.20 | time | 12 hrs. |
| MMA | 6.0 | | |
| Benzene | 12.0 | | |

Figure 3:
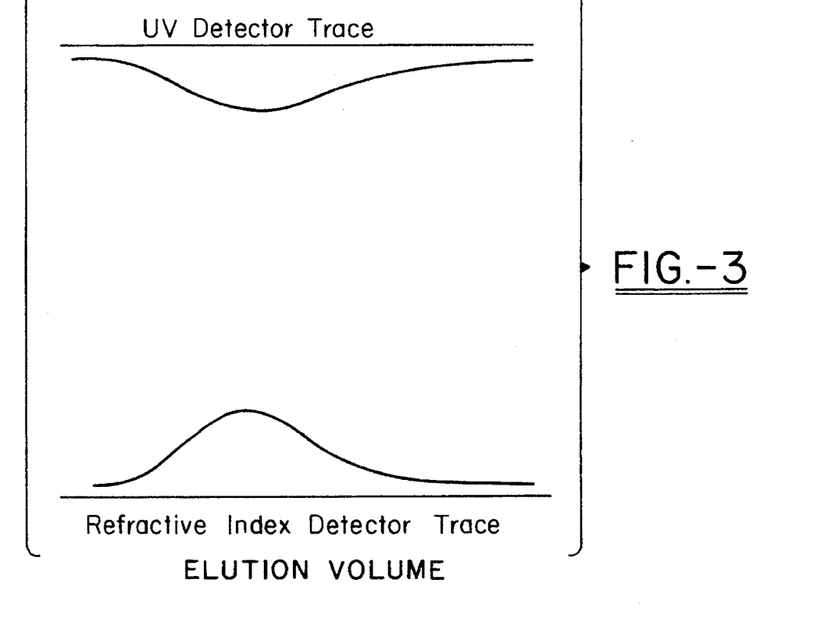
FIG. 3 is a double detector GPC trace for a styrene-methylmethacrylate block copolymer in which the UV detector trace (detector set to 254 nm) is shown above, and the RI detector trace is shown below.

The final solution was diluted with THF and precipitated into methanol. Polymer yield 1.4 g (20% MMA conversion). $M_n$ (GPC): 125,000; $M_w/M_n$: 2.1. A refractive index-UV (RI-UV) double detector GPC trace for the block copolymer is provided in FIG. 3. In this double-detector trace, the UV detector set to 254 nm, which detects only styrene units, gives a signal over the entire range that the RI detector produces a visible trace (UV trace-upper; RI trace-lower). Thus, the polymer is in fact a block copolymer.

Example 15

Synthesis of Telechelic Poly(Styrene-co-Acrylonitrile) Macroinitiator.

| Reactant | grams | Conditions | |
|---|---|---|---|
| Cu$^{II}$ octanoate | 0.10 | | |
| Pyridine | 0.50 | N$_2$ purge | 5 min. |
| DBK | 0.20 | temperature | 70° C. |
| Styrene | 7.0 | time | 6 hrs. |
| Acrylonitrile | 3.5 | | |
| Benzene | 5.0 | | |

The final solution was diluted with THF and precipitated into methanol. Polymer yield: 3.1 g (30%).

Example 16

Synthesis of Poly[(Styrene-co-Acrylonitrile)-b-Chloroprene] Thermoplastic Elastomer Block Copolymer

| Reactant | grams | Conditions | |
|---|---|---|---|
| Cu$^{II}$ octanoate | 1.00 | | |
| Pyridine | 5.0 | N$_2$ purge | 10 min. |
| Triphenylphosphine | 3.0 | temperature | 65° C. |
| P(S-co-AN)-DBK (Ex. 15) | 2.5 | | |
| Triethylamine | 5.0 | time | 6 hrs. |
| Chloroprene | 40.0 | | |
| Toluene | 60.0 | | |

Figure 4:
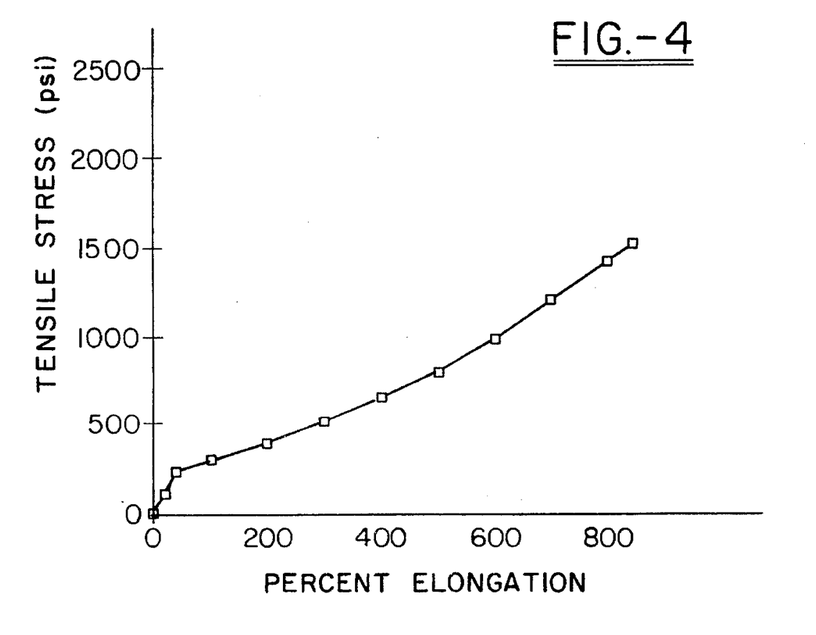
FIG. 4 is a stress-strain curve plotting tensile stress (psi) vs. % elongation for a poly[(styrene-co-acrylonitrile)-b-chloroprene] thermoplastic elastomer block copolymer.

The polymer was diluted with toluene and precipitated in isopropanol. Polymer yield: 7.5 g. The polymer was compression molded at 280° F. with 20 tons pressure for 15 minutes. An Instron tensile stress-strain curve recorded for a dumbbell specimen using a 20 in./min. crosshead speed is provided in FIG. 4.

Example 17

Synthesis of Poly(Styrene-b-Chloroprene) Thermoplastic Elastomer Block Copolymer

| Reactant | grams | Conditions | |
|---|---|---|---|
| Cu$^{II}$ octanoate | 1.0 | | |
| Pyridine | 5.0 | N$_2$ purge | 15 min. |
| Triethylamine | 5.0 | temperature | 65° C. |
| Triphenylphosphine | 3.0 | | |
| PS-DBK Macroinitiator (Ex. 6) | 5.0 | time | 45 min |
| Chloroprene | 80.0 | | |
| Benzene | 50.0 | | |

Figure 5:
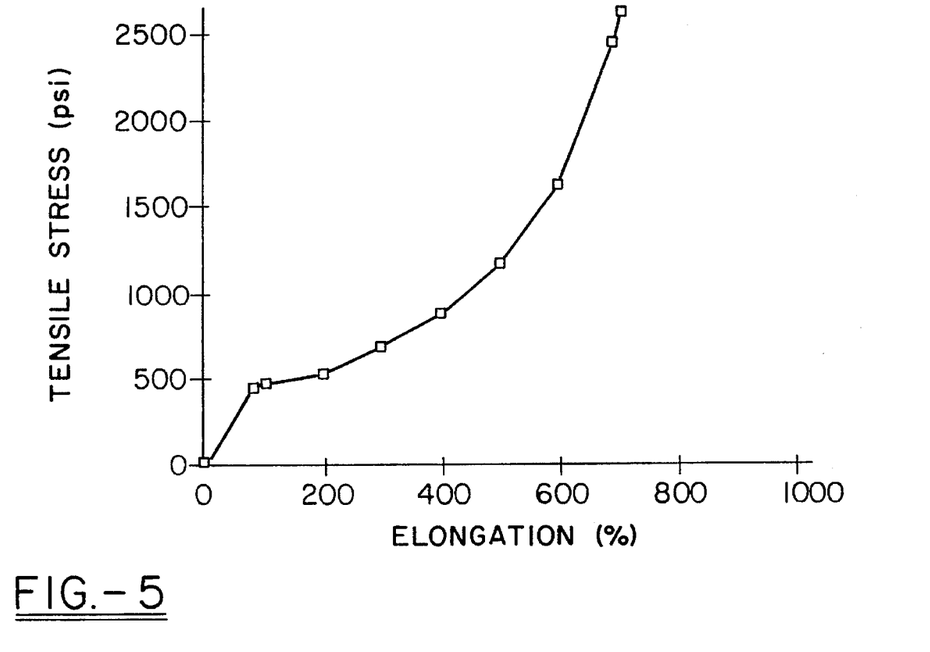
FIG. 5 is a stress-strain curve plotting tensile stress (psi) vs. % elongation for a poly(styrene-b-chloroprene) thermoplastic elastomer block copolymer.

The final solution was diluted with THF and precipitated into methanol. Polymer yield: 12.2 g (9.4% chloroprene conversion). The polymer was compression molded at 280° F. with 20 tons pressure for 15 minutes. An Instron tensile stress-strain curve recorded for a dumbbell specimen using a 20 in./min. crosshead speed is provided in FIG. 5.

Example 18

Synthesis of Poly(Bisphenol-A-Epoxy-b-Ethyl Acrylate) Block Copolymer

| Reactant | grams | Conditions | |
|---|---|---|---|
| Cu$^{II}$ octanoate | 0.10 | | |
| Pyridine | 5.0 | N$_2$ purge | 10 min. |
| Triphenylphosphine | 0.30 | temperature | 65° C. |
| BPA-HPBK Macroinitiator (Ex. 9) | 0.50 | | |
| Ethyl acrylate | 2.50 | time | 19 hrs. |
| Benzene | 5.0 | | |

Figure 6:
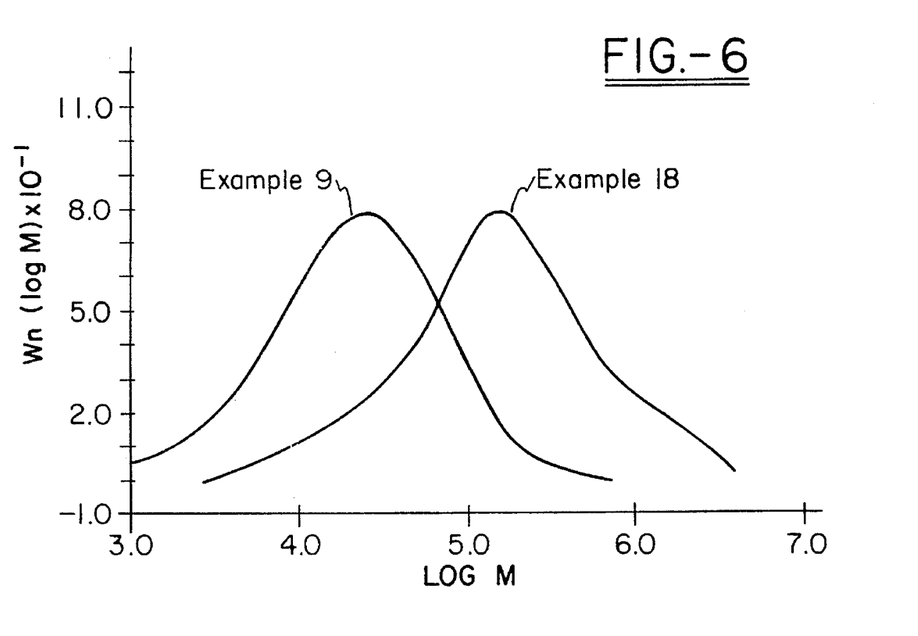
FIG. 6 contains a GPC molecular weight distribution plots for the macroinitiator used to initiate the polymerization (Example 9) and for the final product, a poly(bisphenol-A- epoxy-b-ethyl acrylate) block copolymer (Example 18)

The final solution was diluted with THF and precipitated into hexane. Some of the diluted solution was lost by spillage prior to precipitation. Recovered polymer yield: 1.7 g. A GPC molecular-weight distribution plot showing the MWD traces observed for the block copolymer and the starting epoxy macroinitiator is provided in FIG. 6. None of the macroinitiator trace (Example 9) can be seen in the block copolymer trace (Example 18).

Example 19

Synthesis of Poly[(Styrene-co-Methyl Vinyl Ketone)-g-MMA] Graft Copolymer

| Reactant | grams | Conditions | |
|---|---|---|---|
| Cu$^{II}$ octanoate | 0.10 | | |
| Pyridine | 0.67 | N$_2$ purge | 5 min. |
| Triethylamine | 0.10ml | temperature | 70° C. |
| Triphenylphosphine | 0.30 | | |
| P(S-MVK) (Ex. 12) | 0.50 | time | 24 hrs. |
| MMA | 3.0 | | |
| Benzene | 10.0 | | |

Figure 7:
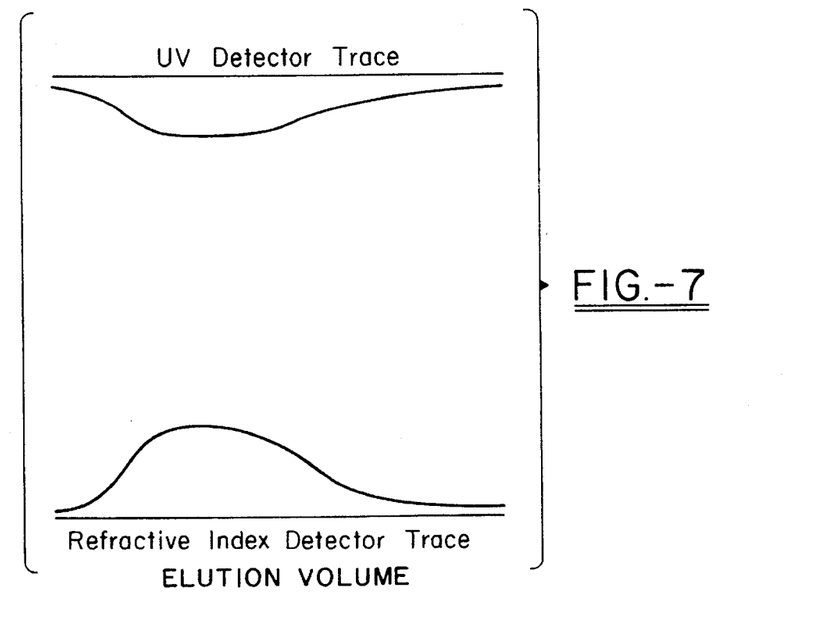
FIG. 7 is a double detector GPC trace for a graft copolymer in which the UV detector trace (detector set to 254 nm) is shown above, and the RI detector trace is shown below.

The final solution was diluted with THF and precipitated into methanol. Polymer yield 2.5 g (67%). A double detector (RI-UV) GPC trace for the block copolymer is provided in FIG. 7. The UV detector trace, set to 254 nm, which detects only styrene units, produces a signal over the entire range, and the RI detector produces a visible trace, indicating that the polymer is in fact a graft copolymer.

Example 21

Emulsion Polymerization of Styrene using Cu$^{II}$-Mesityl Oxide as the Redox Initiating System A 250 ml round-bottom flask equipped with a rubber septum and magnetic stir bar was charged with file following reagents:

| Reactant | grams | Conditions | |
|---|---|---|---|
| Cu$^{II}$ acetate | 0.20 | | |
| Pyridine | 1.3 | N$_2$ purge | 5 min. |
| Triethylamine | 0.10 | temperature | 60° C. |
| Sodium lauryl sulfate | 1.0 | | |
| Mesityl oxide | 0.10 | time | 18 hrs. |
| Styrene | 25.0 | | |
| H$_2$O | 50.0 | | |

The polymer yield was 13.0 g. The initial emulsion had a creamy-purple color. Within 5 minutes, a blue-colored clear liquid phase began to separate from the emulsion, forming small blobs in the emulsion. At the end of 18 hours, the blue liquid blobs had become hardened brown-colored coagulant. The purple-colored latex was separated from the coagulant and then the latex was precipitated in excess methanol. The coagulant was dissolved in THF and precipitated in methanol. Both polymer samples were collected and vacuum-dried. The yield of dried latex polymer was 13.0 g; the yield of dried coagulant was 2.2 g.

This crude formulation merely demonstrates the potential application of the $Cu^{II}$-enolate initiating system to heterogeneous polymerization, including emulsion polymerization.

Example 22

Synthesis of poly[(Styrene-co-Acrylonitrile)-b-Chloroprene] Thermoplastic Block Copolymer

| Reactant | grams | Conditions | |
|---|---|---|---|
| $Cu^{II}$ octanoate | 0.50 | | |
| Pyridine | 3.0 | $N_2$ purge | 10 min. |
| Triphenylphosphine | 1.50 | | |
| Triethylamine | 3.0 | temperature | 65° C. |
| P(S-co-AN)-DBK (Ex. 8) | 2.5 | | |
| Chloroprene | 48.0 | time | 30 min. |
| Toluene | 30.0 | | |

Figure 8:
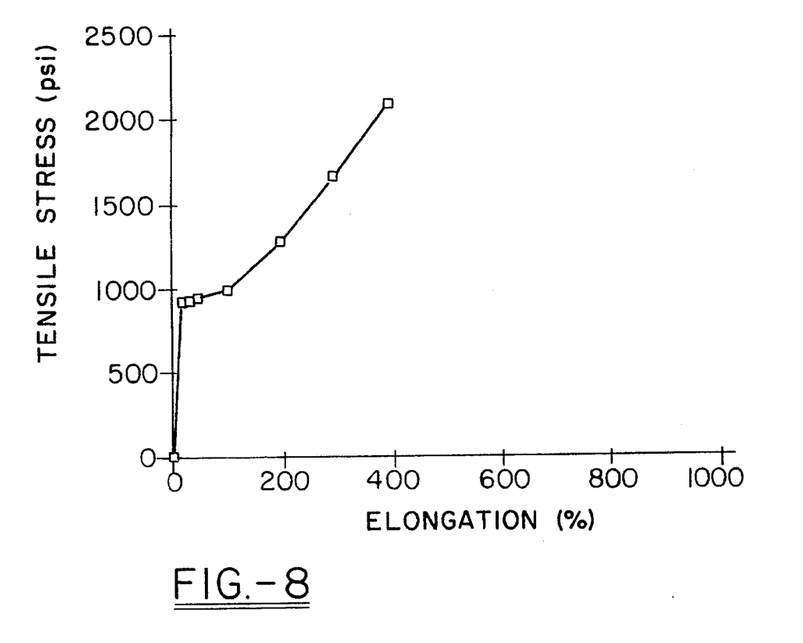
FIG. 8 is a stress-strain curve plotting tensile stress (psi) vs. % elongation for a poly[(styrene-co-acrylonitrile)-b-chloroprene] thermoplastic block copolymer.
Figure 9:
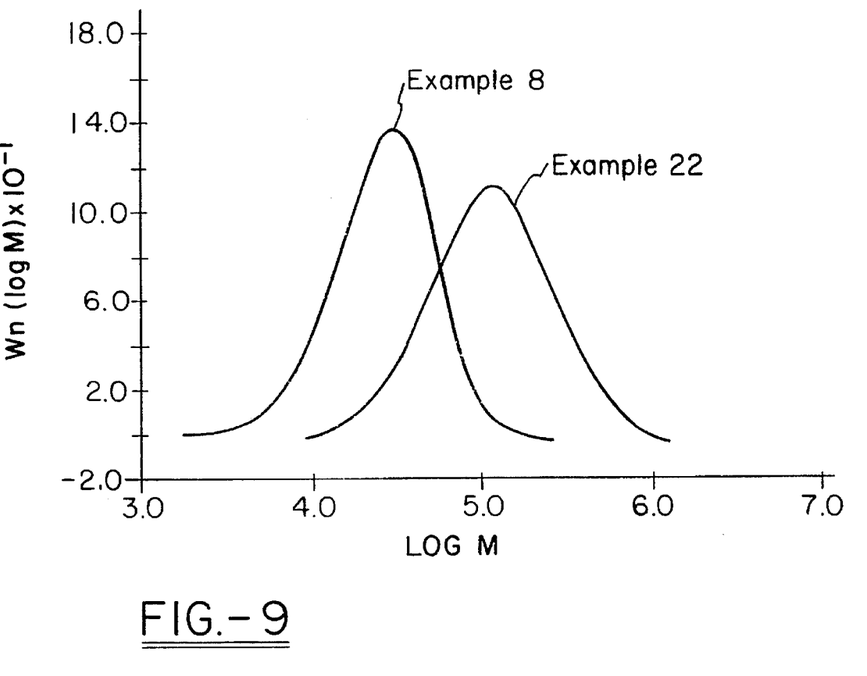
FIG. 9 contains GPC molecular weight distribution plots for the macroinitiator used to initiate the polymerization (Example 8) and for the final product, a poly[(styrene-co-acrylonitrile)-b-chloroprene] block copolymer (Example 22).

The polymer was diluted with toluene and precipitated in isopropanol. The polymer yield was 6.1 g. $M_n$ (GPC, PS standard)=82,500; $M_w/M_n$=1.87. No unreacted macroinitiator was detected in the overlayed GPC plots shown for the macroinitiator (Example 8) and the isolated block copolymer (Example 22) shown in FIG. 8. The polymer was compression molded at 280° F. with 20 tons pressure for 15 minutes. An Instron tensile stress-strain curve recorded for a dumbbell specimen using a 20 in./min. crosshead speed is shown in FIG. 9.

Thus, in general, it can be seen that what is described in its most basic form is a free-radical initiating system for polymerization which has as essential elements, (1) a $Cu^{II}$ salt soluble in the initiating system; (2) an enolizable aldehyde or ketone group having at least one enolizable hydrogen, as shown below and wherein $R^4$, $R^5$, $R^6$, $R^7$, $R^8$, $R^9$, $R^{10}$, $R^{11}$, and $R^{12}$ are radicals, which are independently selected from the group consisting of H, alkyl, aryl, aralkyl, alkaryl, cyclic, heterocycles and functionalized derivatives thereof and other groups that do not interfere with the oxidation or initiation/polymerization reactions, and wherein the Markush groups $R^4$ through $R^{12}$ can either be the same or different, it being recognized that in its broadest sense, the Markush groups $R^4$ through $R^{12}$ could be polymers; and (3) at least one monomer that can be polymerized by free-radical polymerization and that does not bear functionality that interferes with the initiation process and that further, neither the monomer nor radicals derived from it, are oxidized rapidly by $Cu^{II}$.

In a preferred embodiment, at least one R group will be functionalized, and be selected from the group of cyano, hydroxy, carboxylic acid derivative, ester, ether, amide, isocyanate, oxirane, acetate, halogen, ketone and sulfoxy. In a most preferred embodiment, the functionalized R group will be $R^{10}$ and/or $R^{11}$.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for the synthesis of a polymer with controlled, predictable polymer end-group structures under mild oxidative conditions thereby permitting other useful functional groups to be present on the polymer end-groups comprising the steps of:

(a) adding aldehydes or ketones bearing enolizable hydrogen atoms into a reaction vessel;

(b) inducing an enolate oxidation reaction with a $Cu^{II}$ salt to form an enolate radical which has a greater electron donating capability toward the $Cu^{II}$ ion than the non-enolized or enol form of the aldehydes or ketones, the $Cu^{II}$ converting the initiator into α-carbonyl free radicals capable of initiating free radical polymerizations; and (c) reacting the enolate radical with a free-radical polymerizable monomer at a temperature from about −100° C. to about +200° C., for a reaction time from about 1 second to about 48 hours.

2. The process of claim 1 wherein $Cu^I$ salts are present in addition to $Cu^{II}$ salts.

3. The process of claim 2 which further comprises the addition of a ligand for $Cu^{II}$ and $Cu^I$ ions which facilitates the reduction of $Cu^{II}$ to $Cu^I$ and additionally facilitates the dissolution of both $Cu^{II}$ and $Cu^I$ ions.

4. The process of claim 3 wherein the ligand is pyridine.

5. The process of claim 2 which further comprises the addition of a $Cu^I$ ligand to preferentially stabilize the $Cu^I$ thereby enabling a formation of block copolymers when the concentration of end-groups is small.

6. The process of claim 5 wherein the $Cu^I$ ligand is triphenylphosphine.

7. The process of claim 1 which further comprises the addition of a strong non-oxidizable base to facilitate the enolate formation.

8. The process of claim 7 wherein the base is a tertiary amine.

9. The process of claim 1 which further comprises a solvent.

10. The process of claim 9 wherein the solvent has a degree of polarity.

11. The process of claim 1 wherein a rate of initiation is modified by the presence of electron-withdrawing or electron-donating groups capable of increasing or decreasing the acidity of the proton-bearing carbon atoms adjacent to the carbonyl group.

\* \* \* \* \*